United States Patent
Kim et al.

(10) Patent No.: US 8,483,113 B2
(45) Date of Patent: Jul. 9, 2013

(54) APPARATUS AND METHOD FOR MULTICAST AND BROADCAST SERVICE IN A BROADBAND WIRELESS ACCESS SYSTEM

(75) Inventors: Ki-Back Kim, Seongnam-si (KR); Nae-Hyun Lim, Seoul (KR); Sang-Young Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 690 days.

(21) Appl. No.: 12/267,863

(22) Filed: Nov. 10, 2008

(65) Prior Publication Data

US 2009/0122734 A1    May 14, 2009

(30) Foreign Application Priority Data

Nov. 14, 2007  (KR) .................. 10-2007-0116062
Jan. 9, 2008   (KR) .................. 10-2008-0002762

(51) Int. Cl.
*H04H 20/71* (2008.01)
*H04L 12/56* (2006.01)
*H04J 3/26* (2006.01)

(52) U.S. Cl.
USPC ............... 370/312; 370/390; 370/432

(58) Field of Classification Search
None
See application file for complete search history.

(56) References Cited

U.S. PATENT DOCUMENTS

| | | | |
|---|---|---|---|
| 2003/0078061 A1 | 4/2003 | Kim | |
| 2005/0054353 A1 | 3/2005 | Mademann | |
| 2005/0201343 A1* | 9/2005 | Sivalingham et al. | 370/338 |
| 2008/0089265 A1* | 4/2008 | Park et al. | 370/312 |
| 2010/0061288 A1* | 3/2010 | Yun et al. | 370/312 |

* cited by examiner

*Primary Examiner* — Ayaz Sheikh
*Assistant Examiner* — Sori Aga
(74) *Attorney, Agent, or Firm* — Jefferson IP Law, LLP

(57) ABSTRACT

An apparatus and method for providing a Multicast and Broadcast Service (MBS) in a Broadband Wireless Access (BWA) system are provided. The apparatus includes a fragmentation unit, a Generic Routing Encapsulation (GRE) packet generator, and a communication unit. The fragmentation unit fragmentizes MBS traffic received from a network for synchronization. The GRE packet generator generates a GRE packet with each of segments from the fragmentation unit. The communication unit transmits the GRE packet from the GRE packet generator to a Base Station (BS) in consideration of a packet period.

20 Claims, 8 Drawing Sheets

APPARATUS AND METHOD FOR MULTICAST AND BROADCAST SERVICE IN A BROADBAND WIRELESS ACCESS SYSTEM

PRIORITY

This application claims the benefit under 35 U.S.C. §119 (a) of a Korean patent application filed in the Korean Intellectual Property Office on Nov. 14, 2007 and assigned Serial No. 10-2007-0116062 and a Korean patent application filed in the Korean Intellectual Property Office on Jan. 9, 2008 and assigned Serial No. 10-2008-0002762, the entire disclosures of both of which are hereby incorporated by reference.

BACKGROUND OF THE INVENTION

1. Field of the Invention

The present invention relates to an apparatus and method for providing a Multicast and Broadcast Service (MBS) in a Broadband Wireless Access (BWA) system. More particularly, the present invention relates to an apparatus and method for generating an MBS packet that supports timing and packet synchronization.

2. Description of the Related Art

As known in the art, communication systems were originally developed to provide voice services. As technology has evolved, communication systems are now able to provide a data service and various multimedia services as well as the voice services. However, conventional communication systems have failed to satisfy the increasing users' demands for services because of a relatively low bandwidth and an expensive service fee. Moreover, due to the ever-increasing demand for Internet services, the necessity for communication systems capable of efficiently providing the Internet services is increasing. As a result of these trends, Broadband Wireless Access (BWA) systems have been introduced to provide efficient data, multimedia and Internet services.

The BWA systems support various speeds of a variety of data services and multimedia application services (e.g., high quality moving pictures) as well as voice services. The BWA systems can access a Public Switched Telephone Network (PSTN), a Public Switched Data Network (PSDN), an Internet network, an International Mobile Telecommunication-2000 (IMT-2000) network, an Asynchronous Transfer Mode (ATM) network and the like in a mobile or fixed environment based on a wireless medium using a broadband frequency (e.g., 2 GHz, 5 GHz, 26 GHz, 60 GHz, etc.). Also, the BWA systems can support a channel transfer rate of 2 Mbps or more. According to the mobility of a Mobile Station (MS) (i.e., whether it is moving or fixed), a communication environment (i.e., indoor or outdoor), and a channel transfer rate, the BWA systems can be classified into a broadband wireless subscriber network, a broadband mobile access network, and a high-speed wireless Local Area Network (LAN).

A wireless access method of the BWA system is standardized by the Institute of Electrical and Electronics Engineers (IEEE) 802.16 standardization group, which is an international standardization group.

According to the IEEE 802.16 standards, by using a wide data bandwidth, a greater amount of data can be transmitted in a shorter period of time compared to a conventional wireless technology for voice service. In addition, a channel (or a resource) can be shared by all users, resulting in more efficient use of the channel. Moreover, since a Quality of Service (QoS) is ensured, the users can receive different QoSs on the basis of service features.

IEEE 802.16 systems conform to a Multicast and Broadcast Service (MBS) standard that can provide multicast and broadcast services to a plurality of Mobile Stations (MSs). According to the MBS standard, the same MBS zone can be distinguished using a different Connection IDentifier (CID) or a different Security Association (SA). That is, an MBS zone (i.e., an MBS_ZONE) can be distinguished through a CID and an SA. A Base Station (BS) broadcasts MBS_ZONE information through a Downlink Channel Descriptor (DCD) message. That is, it can be said that the MBS_ZONE is a group of BSs using the same CID and SA.

An MBS is divided into a single-BS access and a multi-BS access according to a service access method of an MS. When using the single-BS access method, an MS receives an MBS from one BS in whose service coverage area the MS resides. When using the multi-BS access method, an MS simultaneously receives an MBS from two or more BSs. FIG. 1 illustrates the single-BS access method according to the conventional art. FIG. 2 illustrates the multi-BS access method according to the conventional art.

Referring to FIG. 2, in the multi-BS access method, when an MS is located in an overlapping service coverage area between a serving cell and a neighboring cell, a signal from the neighboring cell does not act as noise caused by interference but acts as a signal gain as a result of Radio Frequency (RF) combining. This is called a macro diversity effect. However, the macro diversity effect can be obtained only when the same signal is transmitted from a serving BS and a neighboring BS. Therefore, in order to provide an MBS, all BSs existing within an MBS_ZONE must transmit the same signal at the same time.

As such, when an MBS is provided, there is a need for timing synchronization such that all BSs existing within the same MBS_ZONE can transmit the same signal at the same time.

As known in the art, a BS fragmentizes or packs a Service Data Unit (SDU) (e.g., an Internet Protocol (IP) packet) received from a network (core service network) to generate a Media Access Control (MAC) Packet Data Unit (PDU). Thereafter, the BS generates a PHYsical (PHY) layer burst by aggregating in the generated MAC PDUs and encodes the PHY layer burst according to a Modulation and Coding Scheme (MCS) level. The reason why a BS fragmentizes and packs a packet received from a network as above is that the packet size is variable. In the case of a multi-BS MBS, it is desirable that an Access Service Network GateWay (ASN_GW, or an MBS controller) performs a fragmentation and packing operation for synchronization, and a BS bypasses a received packet without fragmentation and packing.

That is because, if BSs existing within the same MBS zone separately fragmentize or pack an MBS packet received from a network without considering synchronization, there is a problem that the BSs may generate different sized MAC PDUs for the same content, thus not being capable of transmitting a corresponding content at an exact synchronization time.

In other words, a macro diversity effect on an MBS can be obtained only when a BS avoids a fragmentation or packing operation for an SDU (e.g., an IP packet). In order for the BS to avoid the fragmentation or packing operation, a packet received from a network must be accepted within a MAC PDU. Therefore, a need exists for an apparatus and method for generating an MBS packet that supports timing and packet synchronization.

SUMMARY OF THE INVENTION

An aspect of the present invention is to address at least the above-mentioned problems and/or disadvantages and to provide at least the advantages described below. Accordingly, an aspect of the present invention is to provide an apparatus and method for allowing all Base Stations (BSs) existing in the same MBS zone to transmit the same signal at the same time in a Broadband Wireless Access (BWA) communication system.

Another aspect of the present invention is to provide an apparatus and method for allowing a BS to transmit an MBS packet, which is received from a network, without packetization in a BWA communication system.

A further aspect of the present invention is to provide an apparatus and method for generating an MBS packet adapted to a radio section in a BWA communication system.

Yet another aspect of the present invention is to provide an apparatus and method for determining a size and interval of an MBS packet according to air scheduling information in a BWA communication system.

According to one aspect of the present invention, an apparatus for packetizing Multicast and Broadcast Service (MBS) traffic in a broadcasting service system is provided. The apparatus includes a fragmentation unit, a Generic Routing Encapsulation (GRE) packet generator, and a communication unit. The fragmentation unit fragmentizes MBS traffic, which is received from a network, for synchronization. The GRE packet generator generates a GRE packet with each of segments from the fragmentation unit. The GRE packet includes at least one of a traffic identifier for identifying an MBS or not, an MBS zone identifier, a broadcast channel identifier, and synchronization information. The communication unit transmits the GRE packet from the GRE packet generator to a Base Station (BS) in consideration of a packet period.

According to another aspect of the present invention, a method for packetizing Multicast and Broadcast Service (MBS) traffic in a broadcasting service is provided. The method includes fragmentizing MBS traffic, which is received from a network, for synchronization, generating a Generic Routing Encapsulation (GRE) packet with each of the fragmentized segments, and transmitting the generated GRE packet to a Base Station (BS) in consideration of a packet period. The GRE packet includes at least one of a traffic identifier for identifying an MBS or not, an MBS zone identifier, a broadcast channel identifier, and synchronization information.

According to a further aspect of the present invention, a wireless communication system is provided. The system includes a Multicast and Broadcast Service (MBS) controller and a Base Station (BS). The MBS controller fragmentizes MBS traffic, which is received from a Core Service Network (CSN), for synchronization, generates each of fragmentized segments as a Generic Routing Encapsulation (GRE) packet, and transmits the generated segments to the BS. The GRE packet includes a traffic identifier for identifying an MBS or not, an MBS zone identifier, a broadcast channel identifier, and synchronization information. The BS configures the GRE packet from the MBS controller as a burst with no fragmentation and packing, and transmits the burst to a Mobile Station (MS) on the basis of the synchronization information included in the GRE packet.

Other aspects, advantages, and salient features of the invention will became apparatus to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, it should be noted that like reference numbers are used to depict the same or similar elements, features, and structures.

DETAILED DESCRIPTION OF EXEMPLARY EMBODIMENTS

Figure 1:
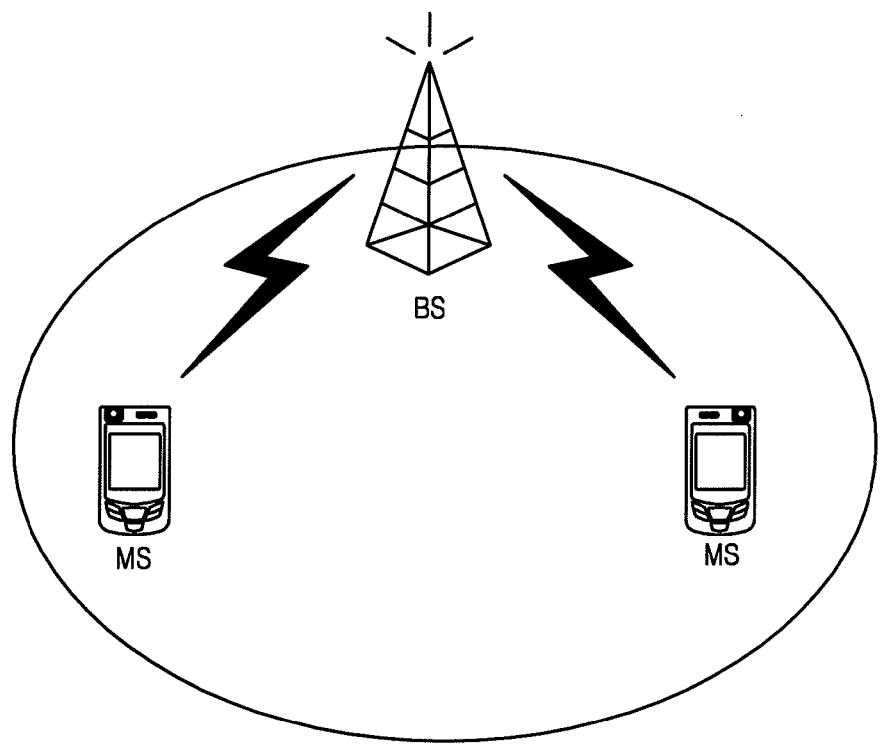
FIG. 1 is a diagram illustrating a single-Base Station (BS) access method in a wireless communication system providing a broadcasting service according to the conventional art.
Figure 2:
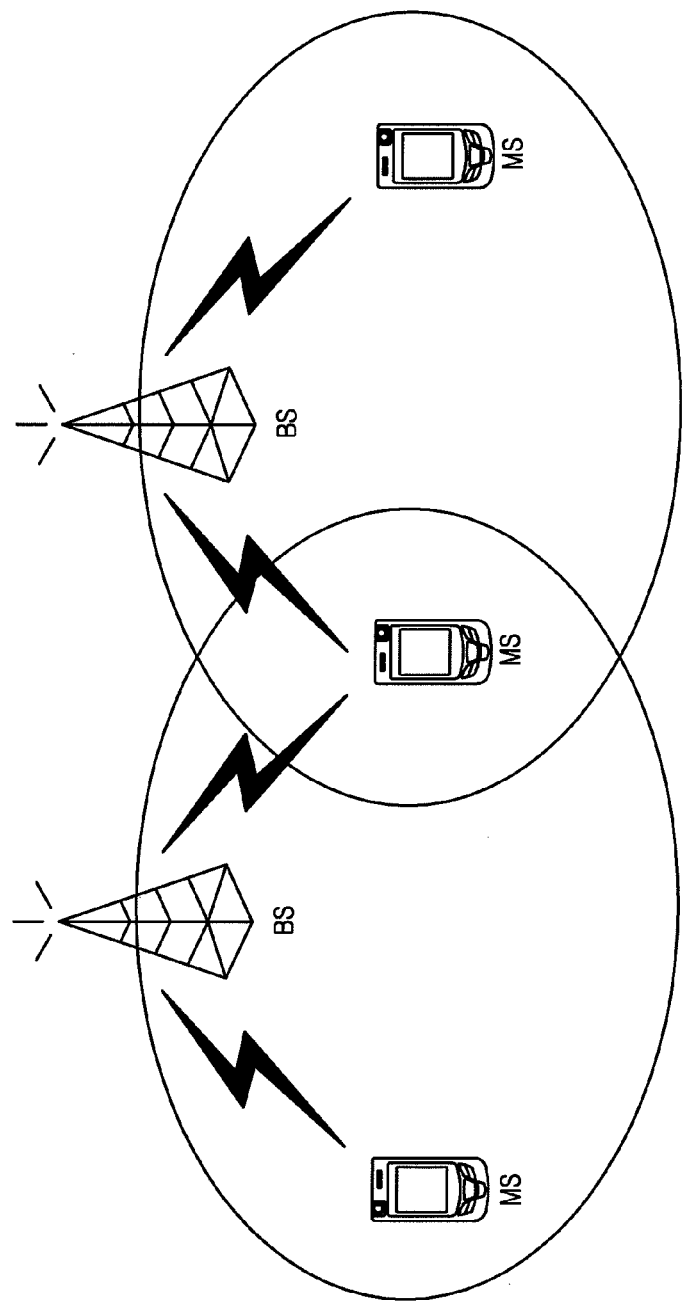
FIG. 2 is a diagram illustrating a multi-BS access method in a wireless communication system providing a broadcasting service according to the conventional art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from scope and spirit of the invention. Also, well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An exemplary method for timing synchronization such that Base Stations (BSs) existing in the same broadcasting zone (e.g., MBS_ZONE) transmit the same signal at the same time in a Broadband Wireless Access (BWA) communication system providing a broadcasting service is described below.

It is preferable that an ASN_GW (or MBS controller) perform a fragmentation and packing operation for the timing synchronization and a BS bypasses a packet received from a network without packetization. That is, in an exemplary embodiment of the present invention, a superordinate component system of a BS previously packetizes MBS traffic adapted to a radio section and transmits the packetized packet to the BS.

The broadcasting service can be called a MultiCast BroadCast Service (MCBCS), a Multicast and Broadcast Service (MBS), a Multimedia Broadcast and Multicast Service (MBMS), a BroadCast/MultiCast Service (BCMCS) and the like depending on the applicable standards groups and operators' intention.

In the description below, the term "Network Entity" (NE) is defined based on a corresponding function and may vary depending on the applicable standards groups and operators' intention. For example, a BS can be referred to as an Access Point (AP), a Radio Access Station (RAS), or a Node-B, and an Access Service Network-GateWay (ASN-GW) can be referred to as a Radio Network Controller (RNC), an Access Control Router (ACR), or a Base Staion Controller (BSC). The ASN-GW can perform a function of the router as well as a function of the BS controller.

The following description is made in the context of an Orthogonal Frequency Division Multiplexing/Orthogonal Frequency Division Multiple Access (OFDM/OFDMA) BWA communication system. However, it is to be understood that this is merely for the sake of the convenience and that the present invention is not limited to an OFDM-based system. Thus, it should be clearly understood that the present invention is also applicable to any other communication system providing a broadcasting service.

Figure 3:
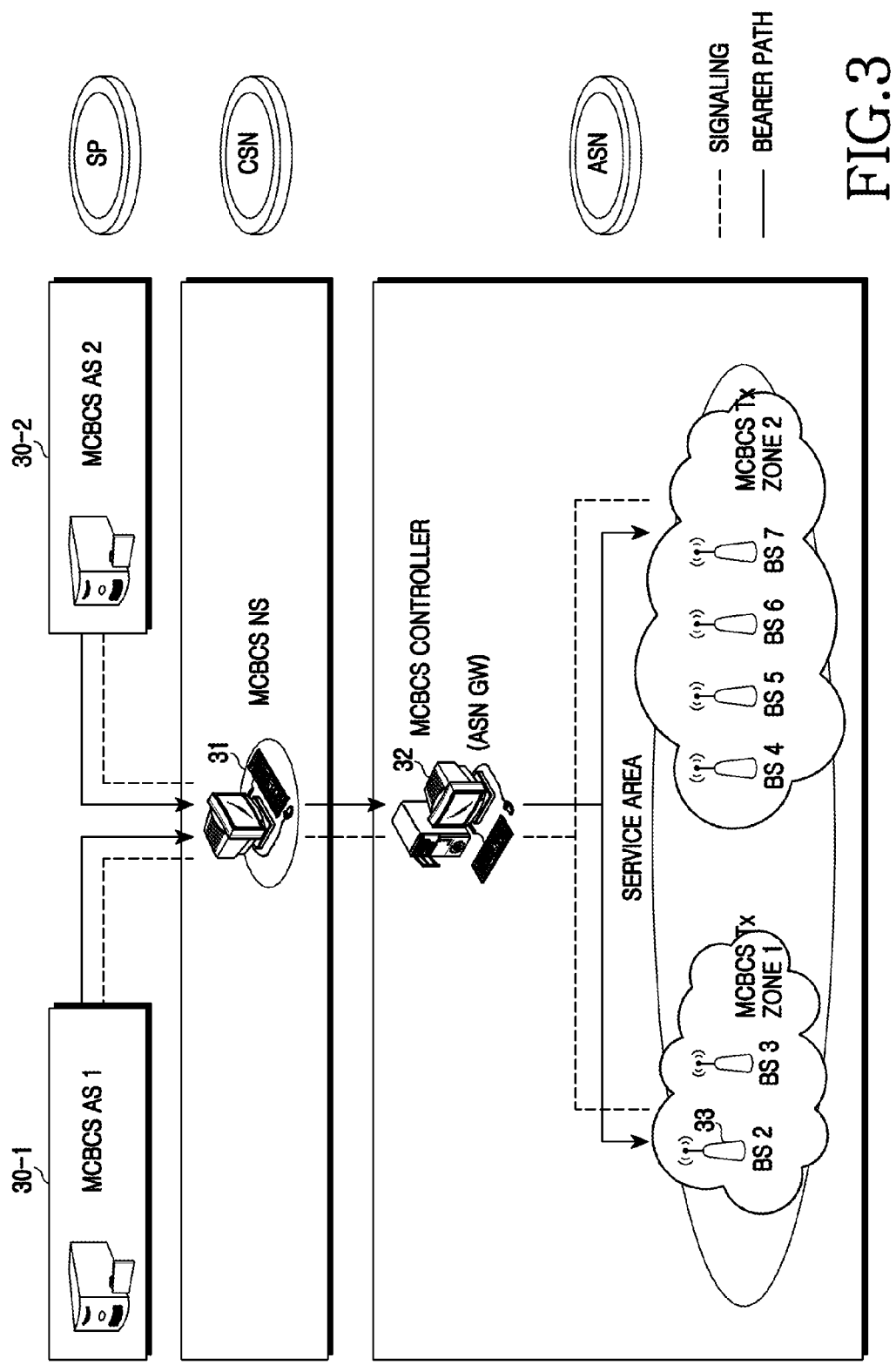
FIG. 3 is a diagram illustrating a network structure according to an exemplary embodiment of the present invention.

FIG. 3 illustrates a network structure according to an exemplary embodiment of the present invention.

As shown in FIG. 3, a network structure is divided into a domain managed by Service Provider (SP) and a domain managed by an Access Provider (AP).

A MultiCast BroadCast Service (MCBCS) Application Server (AS) is managed by an SP. The MCBCS AS generates a service guide for a service area of the SP and provides the service guide to an MCBCS Network Server (NS) 31. The MCBCS AS may also perform functions such as service subscription management, user authentication & authorization management, user group management, contents encoding/decoding key management and distribution, content protection, stream/file transmission, user interaction, notification or alert for informing of urgent advertisement, etc. A content serviced by the MCBCS AS can be provided from a Contents Provider (CP) (not shown). Furthermore, as illustrated in FIG. 3, the functions of the MCBCS AS may be provided by a plurality of servers, in this case two MCBCS ASs 30-1 and 30-2. Each of the MSBCS ASs 30-1 and 30-2 provide the functions as described above but may provide different information as appropriate.

The MCBCS NS 31 gathers MCBCS information (e.g., service guide and the like) from at least one MCBCS AS (i.e. 30-1 and/or 30-2), and performs management for efficient use of network resources. That is, the MCBCS NS 31 performs a function for providing an optimal service guide by synthesizing the condition of an access service network and service guides received from at least one MCBCS AS (i.e. 30-1 and/or 30-2). The MCBCS NS 31 can perform functions such as MCBCS transmission (Tx) zone management, service guide process and distribution, stream/file transmission, multicast group management, reception report management and the like. Herein, some functions of the MCBCS NS 31 may be performed by an NE located in the ASN.

An MCBCS controller 32 is constructed in the ASN (e.g., a block within an ASN-GW) and performs a function of packet/timing synchronization for broadcast content. The MCBCS controller 32 multicasts the synchronized packet to RASs within the same MBS zone.

As shown in FIG. 3, a single service area may be comprised of at least one MCBCS Tx zone, and a single MCBCS Tx zone may be comprised of at least one MBS zone. Each MCBCS Tx zone may be overlapped with another and an overlapping area may be comprised of at least one MBS zone as well.

In an exemplary implementation as illustrated in FIG. 3, an MCBCS Tx Zone 1 includes a BS-2 33. The BS-2 33 transmits a broadcast content received from the MCBCS controller 32 through a determined resource at a determined time. Here, BSs belonging to the same MBS zone broadcast the same content at the same time for macro diversity. A service guide is transmitted to a Mobile Station (MS) through an application layer protocol (e.g., HTTP). Thus, the MS can identify broadcast channels (or a contents list) receivable at a current position through the service guide.

Although not shown, a policy server, an Authentication, Authorization, Accounting (AAA) server, a network management server, and the like can be constructed in the CSN.

As described above, a single MBS_ZONE is comprised of a plurality of BSs, and BSs within the same MBS_ZONE transmit the same broadcast signal at the same time. An exemplary operation for allowing BSs existing within the same broadcasting zone (i.e., an MBS_ZONE) to transmit the same broadcast signal at the same time is described below.

For BSs belonging to the same broadcasting zone to transmit the same broadcast signal, a superordinate system of a BS packetizes MBS data according to radio section information and transmits a thus packetized MBS synchronization packet to the BSs belonging to the same broadcasting zone. A description below is made on the assumption that the packetization is implemented in the MCBCS controller 32.

According to an exemplary embodiment of the present invention, the MCBCS controller 32 manages, by a mapping table, a packet size and packet interval according to a broadcast content air rate and air scheduling information (i.e., an MCS level and an MBS burst size). Thus, if the air rate and air scheduling information are acquired, the MCBCS controller 32 can determine a packet size and packet interval for generating an MBS synchronization packet using the acquired packet size and packet interval. Here, the broadcast content air rate can be determined depending on the kind of content (e.g., audio, video and the like), and the air scheduling information can be either input by a system operator or received from the BS 33. Desirably, the packet interval is determined to be an integer multiple of a radio frame length. For example, when a frame length is assumed to be 5 ms, the packet interval can be determined to be 5 ms, 10 ms, 15 ms, 20 ms, . . . , and the like.

If a packet size and a packet interval are determined as above, the MCBCS controller 32 fragmentizes MBS data received from the MCBCS NS 31 in consideration of the packet size, and generates a Generic Routing Encapsulation (GRE) packet using the fragmentized data. In an exemplary implementation, a header of the GRE packet (i.e., a GRE header) can include a traffic identifier for identifying traffic of a payload, an MBS zone identifier, an MBS channel identifier and the like. A payload of the GRE packet (i.e., a GRE payload) can include synchronization information (i.e., time stamping information, packing & fragmentation indicators, length information etc.), MBS traffic (the fragmentized data) and the like.

The GRE packet is encapsulated with an IP packet. The IP packet is multicast to BSs belonging to the same broadcasting zone. If so, the BSs generate an MBS packet from the MCBCS controller 32 as a MAC PDU (i.e., an MBS burst) as it is with no fragmentation or packing, and map the MBS burst to a defined resource at a corresponding broadcast time. By doing so, the BSs belonging to the same MBS zone can broadcast a corresponding content using the same resource at the same time.

A GRE packet according to an exemplary embodiment of the present invention is described in more detail below.

Figure 4:
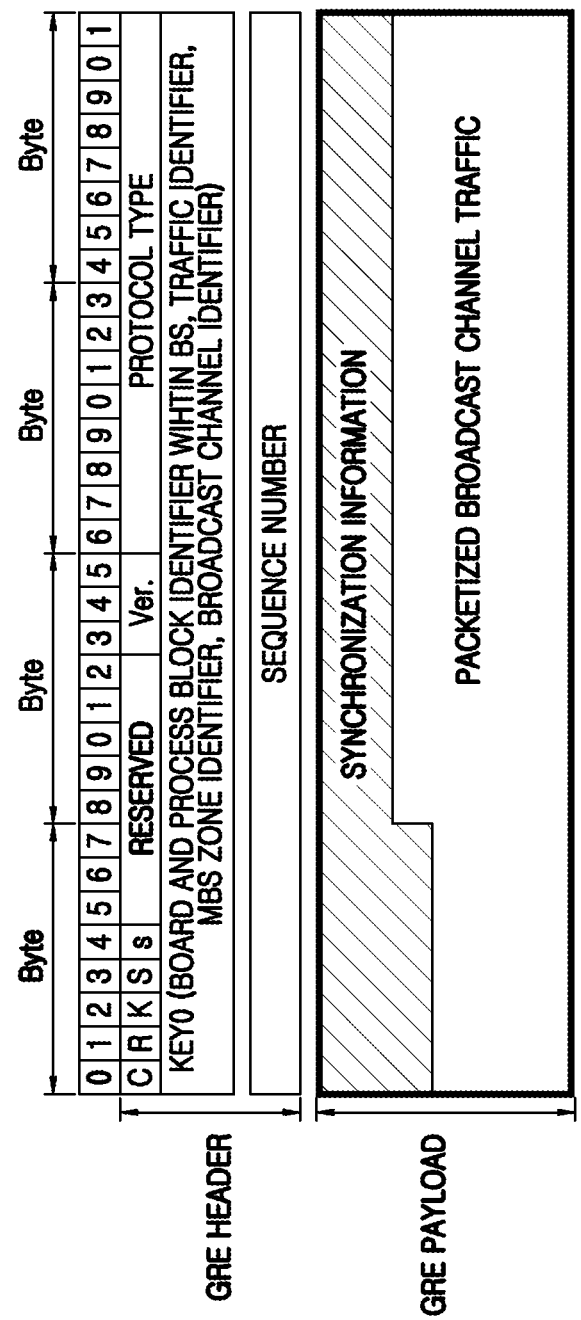
FIG. 4 is a diagram illustrating a structure of a Generic Routing Encapsulation (GRE) packet according to an exemplary embodiment of the present invention.

FIG. 4 is a diagram illustrating a structure of a Generic Routing Encapsulation (GRE) packet according to an exemplary embodiment of the present invention.

Referring to FIG. 4, a GRE packet includes a GRE header and a GRE payload.

The GRE header includes a field of 5 Most Significant Bits (MSBs) (C/R/K/S/s) for setting inclusion or non-inclusion of an option field, a reserved field (RESERVED) of the next 8 bits for future use, a version field (VER) of the next 3 bits for setting a version, a protocol type field (PROTOCOL TYPE) of the next 16 bits for setting a protocol type of a payload, a key field (KEY) of the next 4 bytes for setting a key for a GRE tunnel, and a sequence number field (SEQUENCE NUMBER) of the next 4 bytes for setting a sequence number of a packet. The GRE header can further include a checksum field, an encapsulation recursion control field, an offset field, and a routing field depending on whether a flag of 5 MSBs is set.

In an exemplary embodiment of the present invention, not only information for a GRE tunnel (i.e., a board and process block identifier within a BS and the like) but also MBS related information can be recorded in the key field. The MBS related information can include a traffic identifier for identifying if traffic of a payload is unicast traffic, MBS traffic, or general multicast traffic, an MCBCS service type (e.g., dynamic multicast, static multicast, or broadcast, single-BS MBS, multi-BS MBS without macro diversity, or multi-BS MBS with macro diversity, etc.), an MBS zone identifier, a broadcast channel identifier and the like. Of the MCBCS service type, the dynamic multicast mode is a mode of dynamically switching between broadcast and unicast depending on a number of users receiving a broadcast channel. The static multicast mode is a mode in which an MS uses Internet Group Management Protocol (IGMP) join and does not convert to unicast (i.e., can OFF broadcast). The broadcast mode is a mode for broadcasting a designated broadcast channel at a designated broadcast time. The traffic identifier needs one bit when identifying only unicast traffic and MBS traffic and needs 2 bits when identifying three kinds of traffic. Also, in the case of Worldwide Interoperability for Microwave Access (WiMAX), an MBS zone identifier is equal to one byte (i.e., it is set as MSB=0), and a MAC layer broadcast channel identifier (i.e., a Multicast Connection IDentifier (MCID)) is equal to 12 bits. However, the number of MCIDs is currently equal to 95 (i.e., 0xFEA0 to 0xFEFE) and thus, all broadcast channel identifiers can be expressed with 7 bits. Accordingly, the MBS zone identifier and the MAC layer broadcast channel identifier can be expressed with the minimum 14 bits only.

A multicast IP address of backhaul can be used in place of the MBS zone identifier. In this case, the multicast IP address can be recorded in a payload, not a key field.

The GRE payload includes a first field having a first number of bytes (e.g., 5 bytes) for setting synchronization information and a second field having a second number of bytes for setting an MBS traffic. For example, the synchronization information is recorded with a fixed size following the GRE header. The synchronization information can include absolute broadcast time (e.g., time stamping) information, packing and fragmentation information, length information that represents the whole length of the GRE payload (i.e., the synchronization information length plus the MBS traffic length) and the like. For instance, in the case of WiMAX, a Frame Number (FN) needs 3 bytes when it is being used as the time stamping information. For example, if length of the GRE payload is below 1500 bytes, the length information needs 11 bits (in case of byte count). When the packing and fragmentation information is equal to 2 bits and a reserved field is equal to 3 bits, a field for the synchronization information can be equal to 5 bytes.

An example of a method of expressing packing and fragmentation information is described below. In the following example, '00' represents the non-execution of a fragmentation/packing operation, '01' represents the execution of a packing operation, '10' represents the execution of a fragmentation and zero padding operation and '11' represents the execution of the fragmentation/packing operation.

If the key field is mostly used for other than an MBS, an MBS zone identifier (i.e., MBS zone ID) and a broadcast channel identifier (i.e., MCID) can be also recorded in the synchronization information field. In this case, the synchronization information field needs 10 bytes or 11 bytes in total.

According to an exemplary embodiment of the present invention as illustrated in FIG. 4, the header of the GRE packet sets at least one of a traffic identifier, an MCBCS service type, an MBS zone identifier, and a broadcast channel identifier. The payload sets at least one of time stamping information, packing and fragmentation information, payload length information, and MBS traffic.

According to another exemplary embodiment of the present invention also, the header of the GRE packet can set a traffic identifier. The GRE payload can set at least one of an MCBCS service type, an MBS zone identifier, a broadcast channel identifier, time stamping information, packing and fragmentation information, payload length information, and MBS traffic.

According to yet another exemplary embodiment of the present invention, the header of the GRE packet can set at least one of a traffic identifier, an MCBCS service type, an MBS zone identifier, a broadcast channel identifier, and packing and fragmentation information. The GRE payload can set at least one of time stamping information, payload length information, and MBS traffic.

As such, information recorded in a GRE header and information recorded in a GRE payload can be variously classified. In the aforementioned exemplary embodiment, it has been described that MBS related information is recorded in a key field within the GRE header, but the MBS related information can be also recorded in an option field (e.g., a protocol type field, a sequence number field, a routing field and the like) other than the key field.

While a GRE packet has been described in an exemplary embodiment of the present invention, the present invention can also use a different tunneling packet. Also, while terms are described on the basis of a WiMAX MBS, but it is obvious that the terms can be substituted with others that denote the same concept when a different wireless network is applied.

Figure 5:
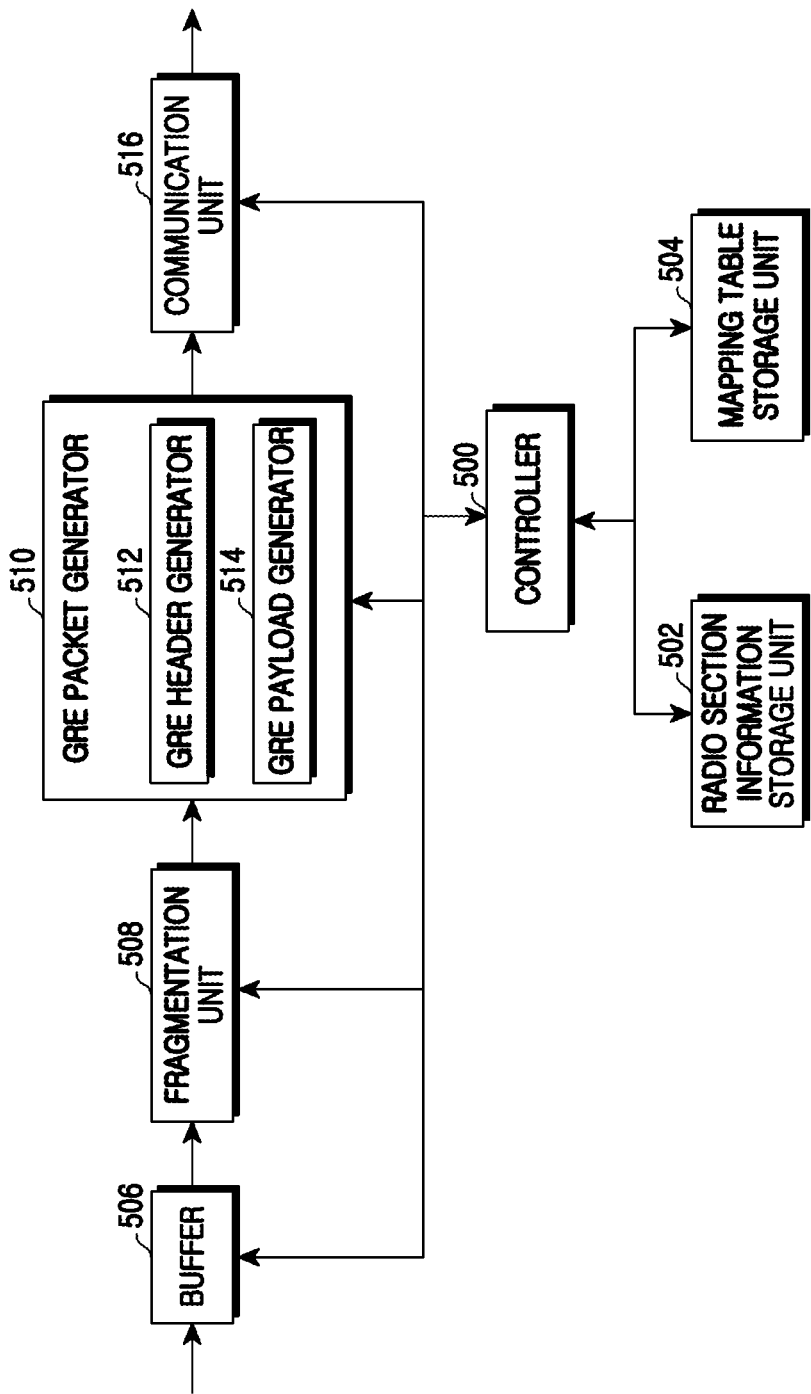
FIG. 5 is a block diagram of a Network Entity (NE) performing packetization according to an exemplary embodiment of the present invention.

FIG. 5 is a block diagram illustrating a construction of a Network Entity (NE) performing packetization according to an exemplary embodiment of the present invention. The NE performing the packetization can be one of an MCBCS NS 31 and an ASN-GW, for example. A description below is made on the assumption that it is performed in an MCBCS controller 32 (or an MBS Data Path Function (DPF)) within the ASN-GW.

In FIG. 5, the MCBCS controller 32 includes a controller 500, a radio section information storage unit 502, a mapping table storage unit 504, a buffer 506, a fragmentation unit 508, a GRE packet generator 510, and a communication unit 516.

Referring to FIG. 5, the controller 500 controls general operations of the MCBCS controller 32. The radio section information storage unit 502 manages radio section information (e.g., air scheduling information and the like) on each of broadcasting zones (i.e., MBS_ZONE). The radio section information can be either input by a system operator or can be received from the BS 33.

The mapping table storage unit 504 manages, by a mapping table, a packet size and packet interval according to a broadcast content air rate and radio section information (e.g., an MCS level and an MBS burst size). For example, the mapping table can be given as in Table 1 below.

TABLE 1

| Air rate [Kbps] | Radio section information (MCS level, burst size) | Packet size [Byte] | Packet interval [ms] |
|---|---|---|---|
| 600 | QPSK, 1/2, 4 symbols | 384 | 5 (=1 frame) |
| . | . | . | . |
| . | . | . | . |
| . | . | . | . |

The controller 500 accesses the mapping table with the broadcast content air rate and the radio section information, determining a packet size and packet interval for generating an MBS synchronization packet. At this time, the controller 500 determines MBS related information (e.g., an MBS zone identifier, a broadcast channel identifier, time stamping information, packet and fragmentation information and the like) to be recorded in each GRE packet. The controller 500 controls a corresponding element according to the determined result.

The buffer 506 buffers MBS data received from a network (i.e., the MCBCS NS 31) and, under control of the controller 500, outputs the MBS data. The fragmentation unit 508 fragmentizes the MBS data from the buffer 506 according to the determined packet size.

The GRE packet generator 510 generates a GRE packet with each fragmentized data from the fragmentation unit 508. Here, a GRE header generator 512 generates a GRE header as shown in FIG. 4. The GRE header records at least one of a traffic identifier, an MBS zone identifier, and a broadcast channel identifier. A GRE payload generator 514 generates a Service Data Unit (SDU) (i.e., an IP packet) with fragmentized data from the fragmentation unit 508 and adds MBS related synchronization information to the SDU, thus generating a GRE payload. The synchronization information can include at least one of time stamping information corresponding to an absolute broadcast time, packing and fragmentation information, GRE payload length information, an MBS zone identifier, and a broadcast channel identifier. The GRE payload generator 514 combines the GRE header with the GRE payload, generating a GRE packet.

The communication unit 516 encapsulates a GRE packet from the GRE packet generator 510 with an IP packet and multicasts the IP packet to BSs belonging to the same broadcasting zone. If a network between a BS controller and a BS is an Ethernet, the communication unit 516 can encapsulate the GRE packet with an Ethernet packet and transmit the Ethernet packet to the BS.

Figure 6:
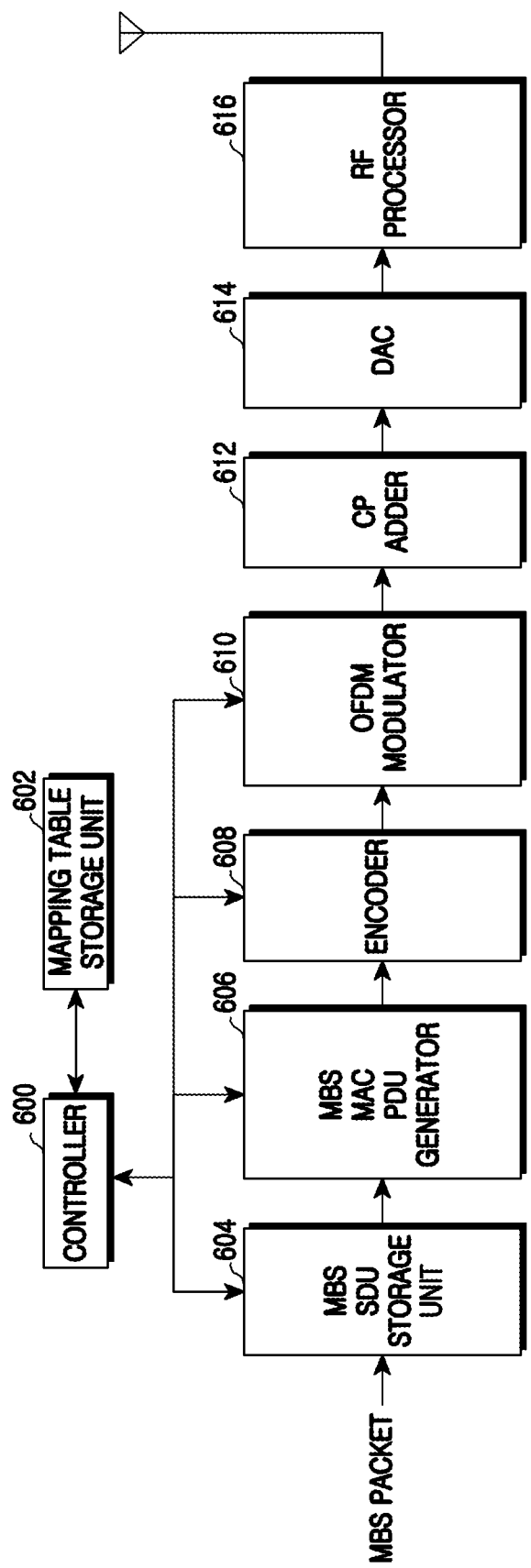
FIG. 6 is a block diagram of a BS according to an exemplary embodiment of the present invention.

FIG. 6 is a block diagram illustrating a construction of a BS according to an exemplary embodiment of the present invention.

Referring to FIG. 6, a BS includes a controller 600, a mapping table storage unit 602, an MBS SDU storage unit 604, an MBS MAC PDU generator 606, an encoder 608, an OFDM modulator 610, a Cyclic Prefix (CP) adder 612, a Digital-to-Analog Converter (DAC) 614, and a Radio Frequency (RF) processor 616.

Referring to FIG. 6, the mapping table storage unit 602 manages a mapping table, for example the mapping table of Table 1. The controller 600 accesses the mapping table with a broadcast content air rate and radio section information (e.g., air scheduling information), thus acquiring a packet size and packet interval of an MBS synchronization packet. For instance, the broadcast content air rate can be determined depending on the kind of content (e.g., audio, video), and the radio section information can be input by a system operator. As such, if a packet size and packet interval of a content are determined, the controller 600 performs resource scheduling using the packet size and packet interval and controls a corresponding element according to the resource scheduling result.

The MBS SDU storage unit 604 buffers MBS packets (i.e., IP packets) received from a network and, under control of the controller 600, outputs each of the buffered MBS packets at corresponding timing. The MBS MAC PDU generator 606 adds a MAC header (i.e., a generic MAC header) to an MBS packet from the MBS SDU storage unit 606 to generate MAC PDU, thus providing the MAC PDU to the encoder 608 of a physical layer. As such, an exemplary embodiment of the present invention configures a packet received from a network into a MAC PDU as it is, and uses the thus configured MAC PDU as a burst of a physical layer as it is. That is, an exemplary embodiment of the present invention can transmit a packet received from a network to a radio section as it is with no fragmentation or packing.

The encoder 608 encodes and modulates a burst (i.e., a MAC PDU) from the MAC PDU generator 606 according to a set MCS level. The OFDM modulator 610 Inverse Fast Fourier Transform (IFFT)-processes data output from the encoder 608 and outputs sample data. The CP adder 612 adds a guard interval (e.g., a Cyclic Prefix) to sample data from the OFDM modulator 610. The DAC 614 converts the sample data from the CP adder 612 into an analog signal. The RF processor 616 converts a baseband signal from the DAC 614 into an RF band signal and transmits the RF band signal through an antenna.

Figure 7:
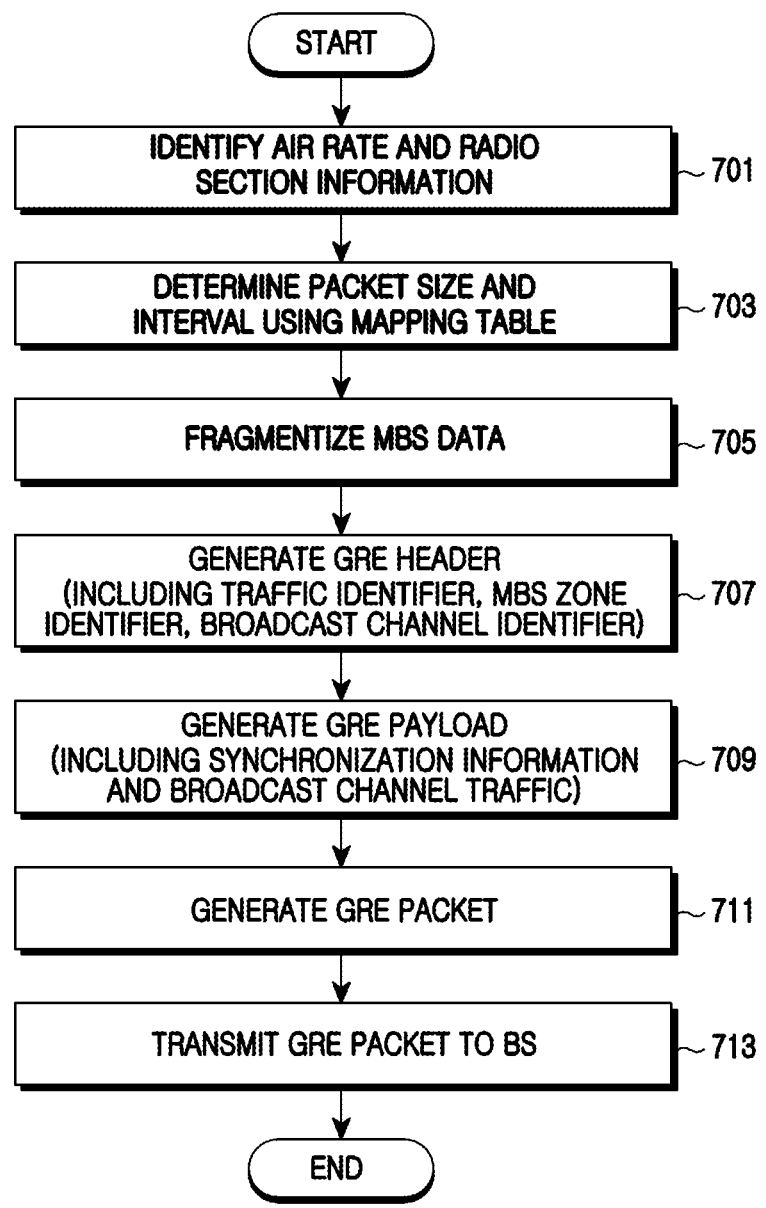
FIG. 7 is a flowchart illustrating an operation of an NE performing packetization according to an exemplary embodiment of the present invention.

FIG. 7 is a flow diagram illustrating an operation of an NE performing packetization according to an exemplary embodiment of the present invention. The NE performing the packetization can be one of an MCBCS NS 31 and an ASN-GW, for example. A description below is made on the assumption that it is performed in an MCBCS controller 32 within the ASN-GW.

Referring to FIG. 7, in step 701, the MCBCS controller 32 identifies an air rate of a broadcast content and radio section information of a corresponding broadcasting zone (i.e., MBS_ZONE). For instance, the air rate of the broadcast content can be determined depending on the kind of content (e.g., audio, video and the like), and the radio section information (i.e., air scheduling information) can be either input by a system operator or can be received from a BS 33.

When the air rate and the radio section information are identified, in step 703, the MCBCS controller 32 accesses a mapping table (i.e., Table 1) with the air rate and the radio section information, acquiring a packet size and packet interval. Thereafter, in step 705, the MCBCS controller 32 fragmentizes MBS data depending on the packet size.

In step 707, the MCBCS controller 32 generates a GRE header for the fragmentized data. The GRE header can set at least one of a traffic identifier for identifying an MBS or not, an MBS zone identifier (i.e., MBS zone ID), and a broadcast channel identifier (i.e., MCID).

Then, in step 709, the MCBCS controller 32 generates an SDU (i.e., an IP packet) with the fragmentized data and generates a GRE payload with MBS related synchronization information and the SDU. The synchronization information can include at least one of time stamping information corresponding to an absolute broadcast time, packing and fragmentation information, GRE payload length information, an MBS zone identifier, and a broadcast channel identifier.

In step 711, the MCBCS controller 32 combines the generated GRE header and GRE payload, to generate a GRE packet. Thereafter, in step 713, the MCBCS controller 32 encapsulates the generated GRE packet with an IP packet, and transmits the IP packet to BSs belonging to the same broadcasting zone.

Figure 8:
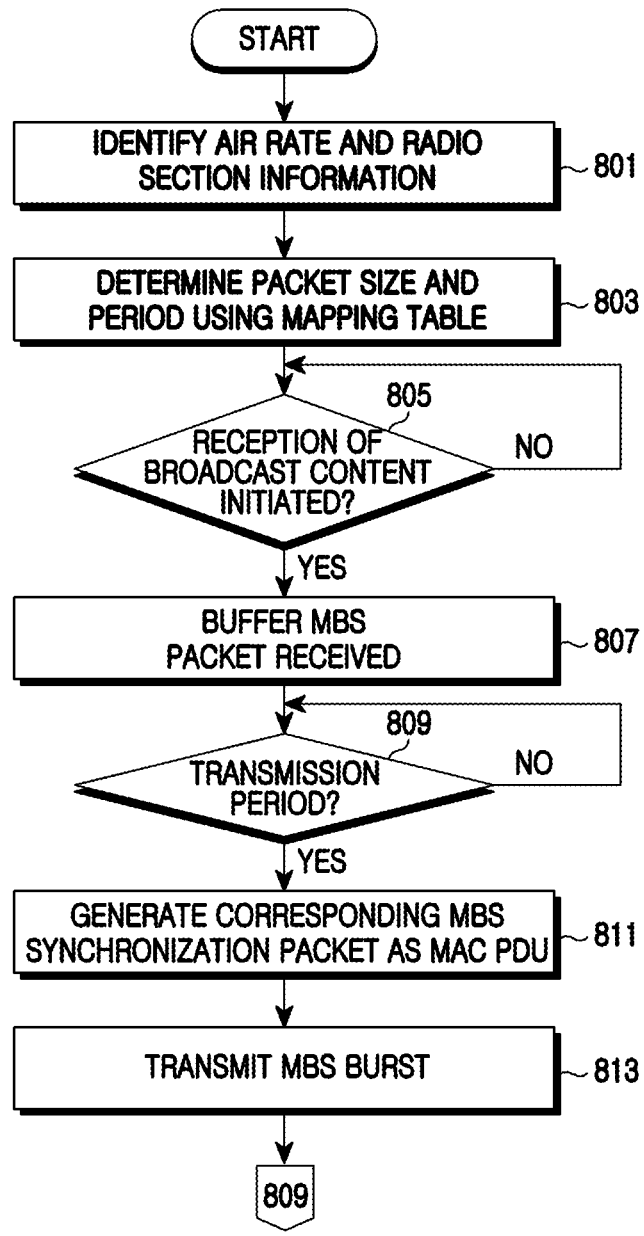
FIG. 8 is a flowchart illustrating an operation of a BS according to an exemplary embodiment of the present invention.

FIG. 8 is a flow diagram illustrating an operation of a BS according to an exemplary embodiment of the present invention.

Referring to FIG. 8, in step 801, a BS 33 identifies an air rate of an MBS content and radio section information. For example, the air rate of the MBS content can be determined according to content type (e.g., audio, video and the like), and the radio section information can be input by a system operator.

When the air rate and the radio section information are identified, in step 803, the BS 33 accesses a mapping table (i.e., Table 1) and, using the air rate and the radio section information, determines a packet size and packet interval. The determined packet size and packet period can be used for resource scheduling.

In step 805, the BS determines if an MBS content is received from a network. If the reception of the MBS content is detected, the BS 33 goes to step 807 and buffers MBS packets (i.e., SDUs and IP packets) received from a network. If the reception of the MBS content is not detected, the BS 33 again performs step 805.

In step 809, the BS 33 determines if it is a transmission time based on the packet interval. If it is not the transmission time, the BS 33 again performs step 809. If it is the transmission time, in step 811, the BS 33 generates a MAC PDU by adding a MAC header to a corresponding MBS packet. In step 813, the BS 33 encodes and modulates the generated MAC PDU (i.e., an MBS burst) according to a set MCS level, and transmits the modulated data through determined resource. Then, the BS 33 returns to step 809 for the next transmission. As such, an exemplary embodiment of the present invention configures a packet (i.e., an SDU) received from a network into a MAC PDU as it is, and transmits the configured MAC PDU as a physical layer burst as it is.

As described above, an exemplary embodiment of the present invention has an advantage that BSs belonging to the same broadcasting zone can perform timing synchronization in a BWA system providing an MBS. That is, an exemplary embodiment of the present invention has an advantage of easily being able to perform timing synchronization for broadcast traffic by allowing an superordinate system of a BS to previously packetize MBS traffic adapted to a radio section and transmit the MBS traffic to the BS, that is, by allowing the BS to avoid separate fragmentation or packing.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for packetizing Multicast and Broadcast Service (MBS) traffic in a system providing a broadcasting service, the apparatus comprising:
   a fragmentation unit for receiving MBS traffic from a network and for fragmentizing the MBS traffic for synchronization;
   a Generic Routing Encapsulation (GRE) packet generator for generating a GRE packet with each of segments from the fragmentation unit, the GRE packet comprising at least one of a traffic identifier for identifying an MBS, an MBS zone identifier, a broadcast channel identifier, and synchronization information; and
   a communication unit for transmitting the GRE packet from the GRE packet generator to a Base Station (BS),
   wherein the GRE packet comprises synchronization information and the synchronization information comprises at least one of time stamping information corresponding to an absolute broadcast time, and packing and fragmentation information, and
   wherein the synchronization information is following a GRE header of the GRE packet.

2. The apparatus of claim 1, wherein the GRE header of the GRE packet comprises at least one of the traffic identifier, an MBS service type, the MBS zone identifier, and the broadcast channel identifier,
   wherein a payload of the GRE packet comprises at least one of the time stamping information and the packing and fragmentation information.

3. The apparatus of claim 1, wherein the GRE header of the GRE packet comprises the traffic identifier,
   wherein a payload of the GRE packet comprises at least one of an MBS service type, the MBS zone identifier, the broadcast channel identifier, the time stamping information, and the packing and fragmentation information.

4. The apparatus of claim 1, wherein the GRE header of the GRE packet comprises at least one of the traffic identifier, an MBS service type, the MBS zone identifier, the broadcast channel identifier, and the packing and fragmentation information,
   wherein a payload of the GRE packet comprises the time stamping information.

5. The apparatus of claim 1, wherein the fragmentation unit fragmentizes the MBS traffic according to a content air rate and radio section information.

6. The apparatus of claim 5, further comprising a storage unit for managing, by a mapping table, a packet size and packet period based on the content air rate and the radio section information.

7. The apparatus of claim 5, wherein the radio section information comprises at least one of a Modulation and Coding Scheme (MCS) level and an MBS burst size.

8. The apparatus of claim 1, wherein the communication unit encapsulates the GRE packet with an IP packet and multicasts the IP packet to a plurality of BSs belonging to the same broadcasting zone.

9. A method for packetizing Multicast and Broadcast Service (MBS) traffic in a system providing a broadcasting service, the method comprising:
   receiving MBS traffic from a network;
   fragmentizing the MBS traffic for synchronization;
   generating a Generic Routing Encapsulation (GRE) packet with each of the fragmentized segments, the GRE packet comprising at least one of a traffic identifier for identifying an MBS, an MBS zone identifier, a broadcast channel identifier, and synchronization information; and
   transmitting the generated GRE packet to a Base Station (BS), wherein the GRE packet comprises synchronization information and the synchronization information comprises at least one of time stamping information corresponding to an absolute broadcast time, and packing and fragmentation information, and wherein the synchronization information is following a GRE header of the GRE packet.

10. The method of claim 9, wherein the generating of the GRE packet comprises:
generating the GRE header; and
generating a payload,
wherein the GRE header of the GRE packet comprises at least one of the traffic identifier, an MBS service type, the MBS zone identifier, and the broadcast channel identifier, and
wherein the payload of the GRE packet comprises at least one of the time stamping information and the packing and fragmentation information.

11. The method of claim 9, wherein the generating of the GRE packet comprises:
generating the GRE header; and
generating a payload,
wherein the GRE header of the GRE packet comprises the traffic identifier, and
wherein the payload of the GRE packet comprises at least one of an MBS service type, the MBS zone identifier, the broadcast channel identifier, the time stamping information, and the packing and fragmentation information.

12. The method of claim 9, wherein the generating of the GRE packet comprises:
generating the GRE header; and
generating a payload,
wherein the GRE header of the GRE packet comprises at least one of the traffic identifier, an MBS service type, the MBS zone identifier, the broadcast channel identifier, and the packing and fragmentation information, and
wherein the payload of the GRE packet comprises the time stamping information.

13. The method of claim 9, wherein the fragmentizing of the MBS traffic comprises fragmentizing the MBS traffic according to a content air rate and radio section information.

14. The method of claim 13, further comprising managing, by a mapping table, a packet size and packet period based on the content air rate and the radio section information.

15. The method of claim 13, wherein the fragmentizing of the MBS traffic according to the radio section information comprises fragmentizing according to at least one of a Modulation and Coding Scheme (MCS) level and an MBS burst size.

16. The method of claim 9, wherein the transmitting comprises:
encapsulating the GRE packet with an IP packet; and
multicasting the IP packet to a plurality of BSs belonging to the same broadcasting zone.

17. A wireless communication system, the system comprising:
a Multicast and Broadcast Service (MBS) controller for fragmentizing MBS traffic, which is received from a Core Service Network (CSN), for synchronization, for generating each of fragmentized segments as a Generic Routing Encapsulation (GRE) packet, and for transmitting the generated segments to a Base Station (BS), the GRE packet comprising at least one of a traffic identifier for identifying an MBS, an MBS zone identifier, a broadcast channel identifier, and synchronization information,
wherein the BS configures the GRE packet from the MBS controller as a burst with no fragmentation and packing, and transmits the burst to a Mobile Station (MS) on the basis of the synchronization information comprised in the GRE packet,
wherein the GRE packet comprises synchronization information and the synchronization information comprises at least one of time stamping information corresponding to an absolute broadcast time, and packing and fragmentation information, and
wherein the synchronization information is following a GRE header of the GRE packet.

18. The system of claim 17, wherein the GRE header of the GRE packet comprises at least one of the traffic identifier, an MBS service type, the MBS zone identifier, and the broadcast channel identifier,
wherein a payload of the GRE packet comprises at least one of the time stamping information and the packing and fragmentation information.

19. The system of claim 17, wherein the GRE header of the GRE packet comprises the traffic identifier,
wherein a payload of the GRE packet comprises at least one of an MBS service type, the MBS zone identifier, the broadcast channel identifier, the time stamping information, and the packing and the fragmentation information.

20. The system of claim 17, wherein the GRE header of the GRE packet comprises at least one of the traffic identifier, an MBS service type, the MBS zone identifier, the broadcast channel identifier, and the packing and fragmentation information,
wherein a payload of the GRE packet comprises the time stamping information.

* * * * *